(12) United States Patent
Clifford

(10) Patent No.: US 7,908,756 B2
(45) Date of Patent: Mar. 22, 2011

(54) INTEGRATED CALIBRATION SPHERE AND CALIBRATION STEP FIXTURE FOR IMPROVED COORDINATE MEASUREMENT MACHINE CALIBRATION

(75) Inventor: Harry J. Clifford, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 594 days.

(21) Appl. No.: 11/871,658

(22) Filed: Oct. 12, 2007

(65) Prior Publication Data

US 2009/0094847 A1 Apr. 16, 2009

(51) Int. Cl.
*G01B 1/00* (2006.01)
*G01B 5/004* (2006.01)
*G01B 5/00* (2006.01)

(52) U.S. Cl. .......................................... 33/502

(58) Field of Classification Search ............ 33/502–504, 33/558, 559, 1 PT; 73/1.01, 1.79, 1.81
See application file for complete search history.

(56) References Cited

U.S. PATENT DOCUMENTS

| | | | |
|---|---|---|---|
| 5,016,199 A | | 5/1991 | McMurtry et al. |
| 5,430,948 A | | 7/1995 | Vander Wal, III |
| 6,493,956 B1 | * | 12/2002 | Matsuda .................. 33/502 |
| 6,640,607 B2 | * | 11/2003 | Abbe ..................... 73/1.01 |
| 6,748,790 B2 | * | 6/2004 | Abbe ..................... 73/1.79 |
| 7,043,961 B2 | | 5/2006 | Pandey et al. |
| 7,246,448 B2 | * | 7/2007 | Lotze ..................... 33/559 |
| 2002/0148275 A1 | * | 10/2002 | Abbe ..................... 73/1.01 |
| 2002/0189319 A1 | * | 12/2002 | Abbe ..................... 73/1.01 |
| 2003/0084584 A1 | | 5/2003 | Osterstock |
| 2004/0244464 A1 | * | 12/2004 | Hajdukiewicz et al. ....... 73/1.79 |
| 2005/0066534 A1 | * | 3/2005 | Matsuda .................. 33/502 |
| 2006/0053646 A1 | * | 3/2006 | McFarland ............... 33/503 |
| 2006/0117587 A1 | * | 6/2006 | Lotze ..................... 33/559 |
| 2008/0249737 A1 | * | 10/2008 | Jordil et al. .............. 702/152 |
| 2008/0295571 A1 | * | 12/2008 | Takahama et al. ........... 73/1.89 |
| 2009/0082986 A1 | * | 3/2009 | Pettersson ............... 702/95 |
| 2009/0248345 A1 | * | 10/2009 | Jonas et al. ............... 33/502 |
| 2009/0307915 A1 | * | 12/2009 | Sutherland ............... 33/502 |
| 2010/0007895 A1 | * | 1/2010 | Yamagata et al. ........... 356/511 |
| 2010/0101104 A1 | * | 4/2010 | Grzesiak et al. ........... 33/502 |

* cited by examiner

*Primary Examiner* — Yaritza Guadalupe-McCall
(74) *Attorney, Agent, or Firm* — John P. O'Banion

(57) ABSTRACT

A method and apparatus for mounting a calibration sphere to a calibration fixture for Coordinate Measurement Machine (CMM) calibration and qualification is described, decreasing the time required for such qualification, thus allowing the CMM to be used more productively. A number of embodiments are disclosed that allow for new and retrofit manufacture to perform as integrated calibration sphere and calibration fixture devices. This invention renders unnecessary the removal of a calibration sphere prior to CMM measurement of calibration features on calibration fixtures, thereby greatly reducing the time spent qualifying a CMM.

14 Claims, 7 Drawing Sheets

INTEGRATED CALIBRATION SPHERE AND CALIBRATION STEP FIXTURE FOR IMPROVED COORDINATE MEASUREMENT MACHINE CALIBRATION

STATEMENT REGARDING FEDERALLY SPONSORED RESEARCH OR DEVELOPMENT

This invention was made with Government support under Contract No. DE-AC52-06NA25396 awarded by the U.S. Department of Energy. The Government has certain rights in this invention.

CROSS-REFERENCE TO RELATED APPLICATIONS

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to fixtures and calibration spheres used for the calibration and accuracy verification of coordinate measurement machines (CMMs), and more particularly to integrated fixtures comprising a calibration sphere permanently or removably attached to a stepped calibration fixture reference for improved CMM qualification and calibration.

2. Description of Related Art

Coordinate measurement machines (CMMs) are widely used in industry for dimensional verification of miscellaneous parts. CMMs easily have measurement precision in the 0.0001 inch range (2.54 μm) or better. However, such measurements must be traced to dimensional standards in order to validate their accuracies. This process is known as calibration.

A simplistic non-CMM calibration occurs when one measures a precision one inch steel gage block (here the measurement reference) with a micrometer or vernier caliper, which in turn reads 1.000 inches indicated on the device when in calibration. CMMs are much more complicated, able to render coordinate measurements in three dimensions with much higher precision.

Precision is typically used in the science and engineering communities to describe the repeatability of a set of measurements. Accuracy, however, is the degree in which a measurement reflects a correct value. Typically, engineering measurements are described as a number plus or minus a tolerance. For high precision designs, one may turn to even more complex tolerance annotations, such as ANSI Y14.5.

U.S. Pat. No. 5,430,948, entitled "Coordinate Measuring Machine Certification System", was issued on Jul. 11, 1995, and is hereby incorporated by reference in its entirety (hereinafter referred to as the '948 patent). The '948 patent provides a method and apparatus for certifying a coordinate measuring machine that includes a certified ballbar, having a pair of spherical surfaces connected with a bar and having certified diameters separated by a certified distance, that is positioned with a positioning device. The positioning device includes a bar support that supports the ballbar at a midpoint of the bar between the balls, wherein the ballbar is supported free of attachment to the balls. The positioning device includes a first rotational assembly for rotatably supporting the ball support for rotation motion about a horizontal axis and a second rotational assembly for rotatably supporting the bar support about a vertical axis. The first rotational assembly provides rotation of the bar support in a clockwise direction to position the ballbar in a first set of angular orientations and in a counterclockwise direction to position the ballbar in a second set of angular orientations. The second rotational assembly provides rotation of the bar support in substantially a complete revolution. While the '948 patent may allow for manual or computer programmed measurement operations, it does not allow for quick calibrations using calibration bars having precisely stepped features at calibrated locations so as to calibrate a CMM over an entire length of distance.

Typical methods of CMM calibration a distance involve a sequence of steps first measuring a stand-alone calibration sphere, removing the calibration sphere, then attaching a stepped calibration fixture along one or two dimensions, and finally measuring the calibration fixture at one or more of the prescribed calibrated surfaces. Should an error occur during the calibration fixture measurement process, the calibration fixture must then be removed, and then the entire calibration sequence repeated with replacement of the calibration sphere. Such iteration step requires on average about 30 minutes for experienced measurement scientists, a significant time in the day of a work shift on an expensive CMM.

BRIEF SUMMARY OF THE INVENTION

An aspect of the invention is an integrated calibration sphere and qualification fixture. In one embodiment, the fixture comprises: a calibration sphere; a calibration fixture comprising a plurality of calibration features; and means for attaching the calibration sphere to the qualification fixture. The calibration features may be planes, or cylindrical or spherical surfaces. The calibration feature is typified by a well known geometry leading to accurate measurement of the feature. In some calibration features, various basic calibration features may be combined to permit even more measurement information to be conveyed, for instance, intersecting planes may be used to convey perpendicular surfaces or other fixed angles of intersection. Typically, sets of calibration features are repeated in sets to provide for measurement patterns easily input into a CMM.

The means for attaching the calibration sphere to the calibration fixture may be either removable or non-removable. By removable, it is understood that the calibration fixture may be removed and reused without recalibration or re-measurement, e.g., it is not destroyed by distorting any of its calibration features during the process of removal.

In one embodiment, the removable means for attaching the calibration sphere may comprise a mount removably attaching to the calibration fixture wherein the calibration sphere is either a fixed or removable attachment to the mount.

In one embodiment, the means for attaching the calibration sphere to the calibration fixture may comprise a clamp, whereby the calibration fixture measurement surfaces are not substantially deflected by attachment to the clamp. Typically, railing that appears sections of solid bars are not significantly deflected by a mere light compression force that is opposed on two opposite sides of the bars that are evenly matched, i.e., no net torque is generated from the attachment of the clamp beyond the clamp attachment features.

In one embodiment, the means for attaching the calibration sphere to the calibration fixture may comprise a clamp that provides a removable attachment to the calibration fixture. In this embodiment, the clamp also provides attachment to the calibration sphere. The clamp may directly attach to the calibration sphere, or may directly attach to a pedestal, which in turn attaches to the calibration sphere.

In one embodiment, the means for attaching the calibration sphere to the calibration fixture (or pedestal) may also comprise a threaded portion threaded into a receiving portion of the calibration sphere, wherein the calibration sphere is removable. Other typical means for attachment could include mortise and tenon connections, Morse taper fits, or an adhesive disposed between the calibration sphere and the calibration fixture when the calibration sphere is removable. In the latter embodiment, the adhesive would be chosen so as to make the calibration sphere removable (e.g. this would not be a high strength waterproof epoxy).

In another embodiment, an integrated calibration sphere and calibration fixture comprises: a calibration sphere; a calibration fixture comprising a plurality of calibration features; and a mount, disposed between and attaches to, each of the calibration sphere and the calibration fixture.

The mount may comprise either a removable attachment of the calibration sphere, or a removable attachment of the calibration fixture. In either implementation, the calibration sphere is ultimately able to be removed from the vicinity of the calibration fixture as needed.

The mount may also non-removably attach to the calibration sphere and to the calibration fixture. Thus, the mount may comprise removable or nonremovable attachments to one or both of the attachments of the group consisting essentially of an attachment of the calibration sphere, and an attachment of the calibration fixture.

In one embodiment, the mount may comprise a clamp, whereby the calibration fixture calibration features are not substantially deflected by attachment to the clamp; and means for attaching the mount to the calibration sphere, wherein the means for attaching causes a deformation of the mounted calibration sphere by less than an allowable tolerance of the calibration sphere prior to being mounted. Alternatively speaking, the means for attaching fails to cause a deformation of the mounted calibration sphere by more than an allowable tolerance of the unmounted calibration sphere.

In one embodiment, the amount of allowed attachment deflection may comprise a deflection of the calibration fixture calibration features measured to be within an original tolerance of the calibration fixture prior to being mounted.

In various embodiments, the mount attachment of the calibration sphere to the calibration fixture may be selected from one or more of a group consisting essentially of a threaded portion that projects from the mount, threaded into a receiver portion of the calibration sphere; a precision ground pin that projects from the mount into a close-fit receiver portion of the calibration sphere; and a flat region on the mount, to which the calibration fixture is glued to the mount via an adhesive.

A still further aspect of the invention is a method of coordinate measurement machine calibration using an integrated calibration sphere and calibration fixture. In one embodiment, the method comprises:

(a) providing an integrated calibration sphere mounted to a calibration fixture;

(b) qualifying a coordinate measurement machine (CMM) by measuring the calibration sphere; then (c) measuring a plurality of calibrated features on the calibration fixture;

(d) determining whether the CMM measures within an allowable tolerance zone:

(i) if within the tolerance zone, then completing the CMM calibration; otherwise, (ii) returning to step (b) without removal of the calibration sphere.

An integrated calibration sphere and calibration fixture is a device capable of being used in any of the preceding methods.

The integrated calibration sphere and calibration fixture above may be described where the integrated calibration sphere mounted to the calibration fixture is removable.

Still another aspect of the invention is an improved calibration fixture for integrated calibration sphere and calibration fixture coordinate measurement machine (CMM) calibration.

In one embodiment, the improvement comprises a calibration sphere mounted to the calibration fixture to allow CMM measurement of the calibration sphere and the calibration fixture without removal of either the calibration sphere or the calibration fixture from the CMM.

The improved calibration fixture may be characterized by having the calibration sphere removably mounted to the calibration fixture.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 7:
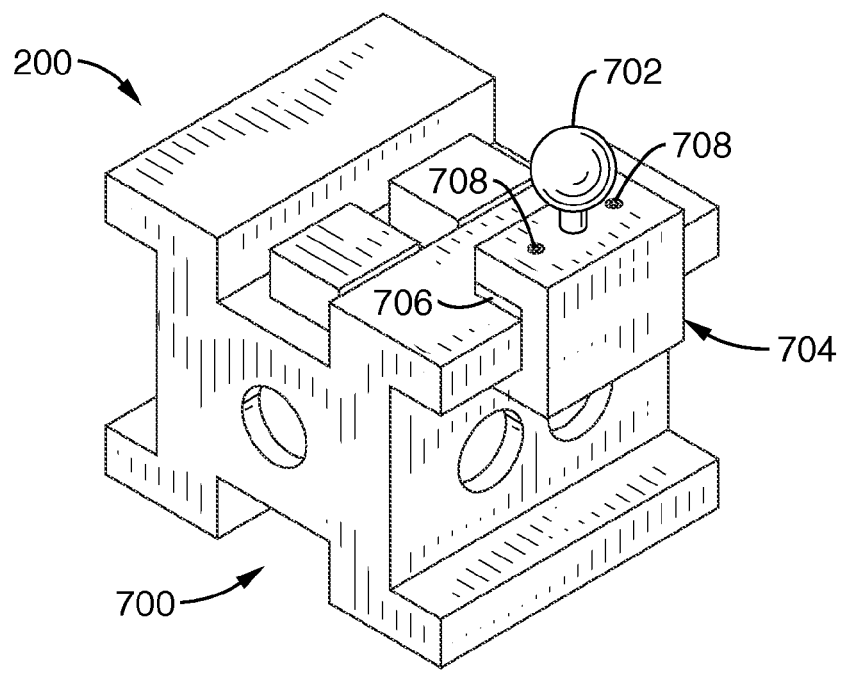
FIG. 7 is a perspective view of another embodiment of the calibration sphere directly mounted to the calibration fixture previously shown in FIG. 2.
Figure 8:
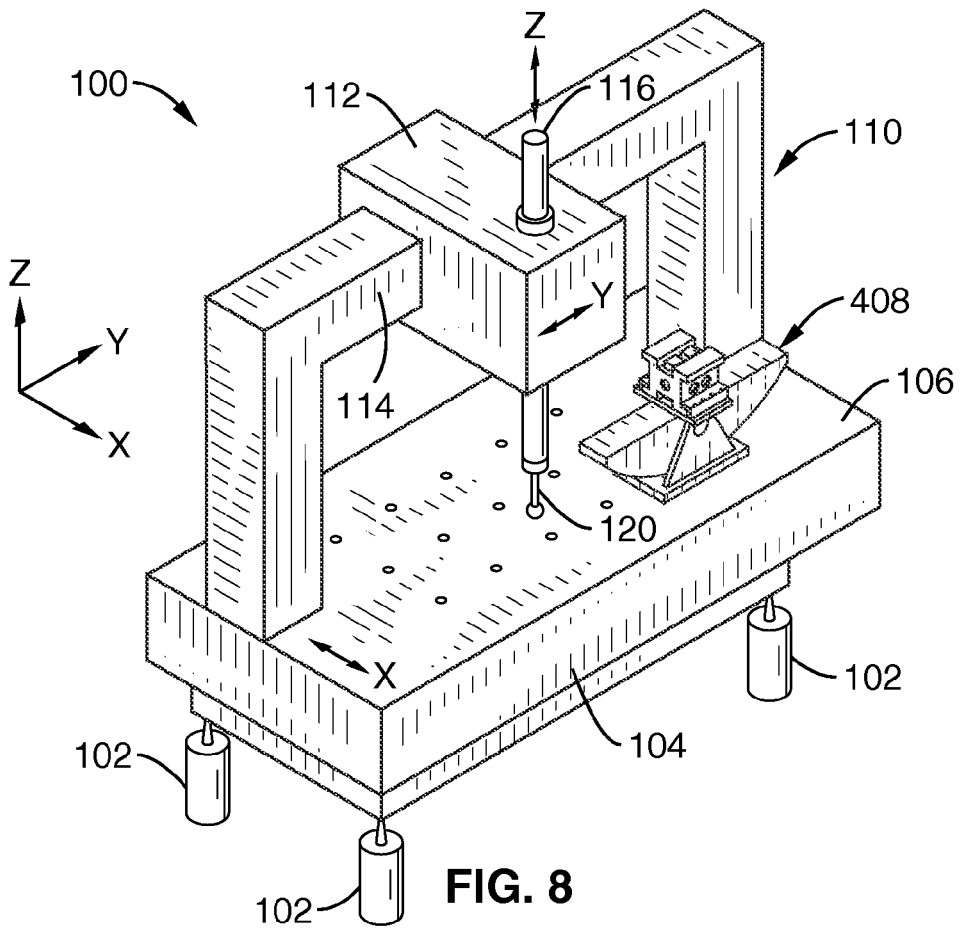
FIG. 8 is a perspective view of the FIG. 1 CMM with the integrated calibration sphere and calibration fixture of FIG. 6A.
Figure 9:
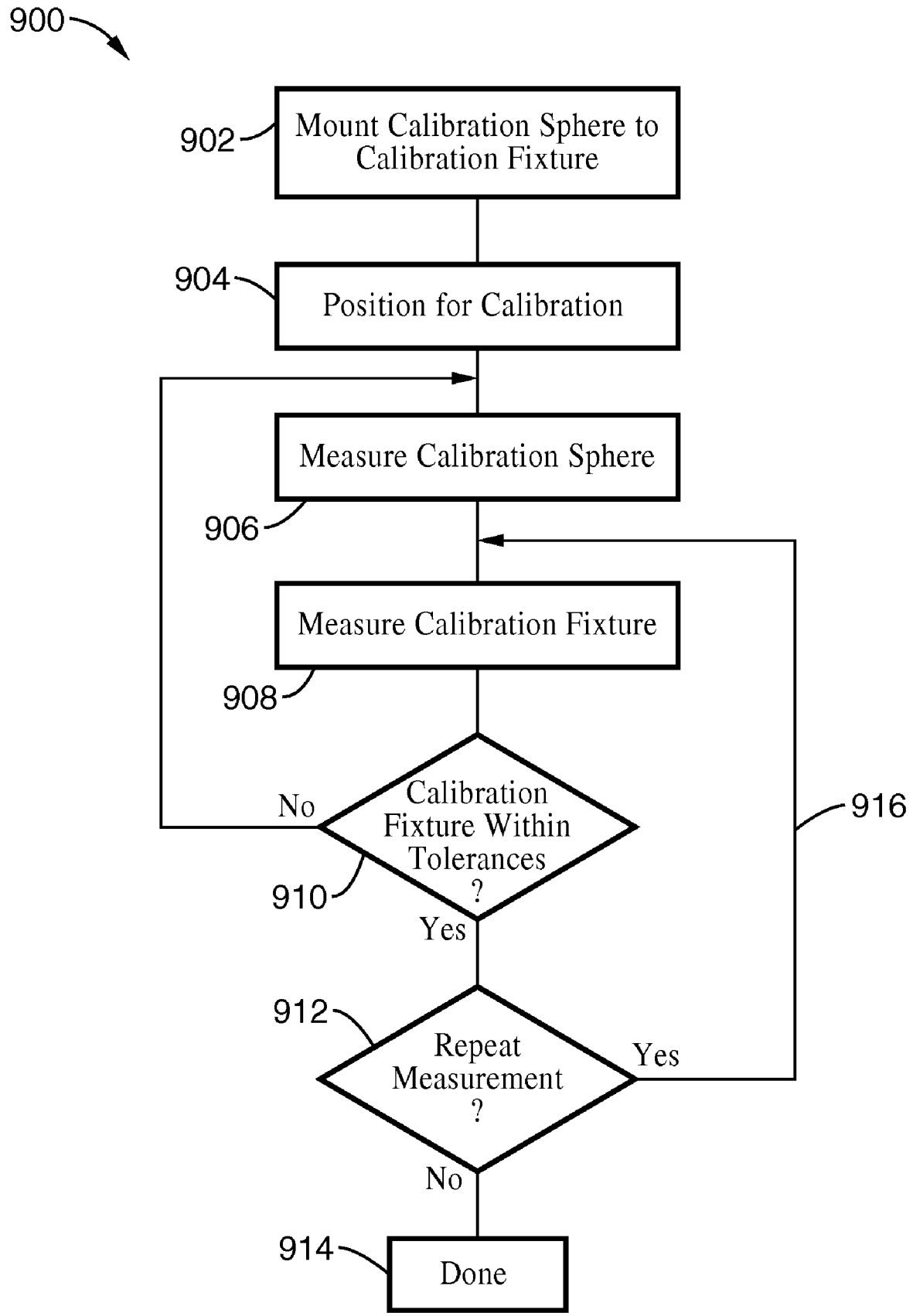
FIG. 9 is a flow chart illustrating an embodiment of a calibration method according to the present invention.

Referring more specifically to the drawings, for illustrative purposes the present invention is embodied in the apparatus generally shown in FIG. 1 through FIG. 8 and the method generally shown in FIG. 9. It will be appreciated that the apparatus may vary as to configuration and as to details of the parts, and that the method may vary as to the specific steps and sequence, without departing from the basic concepts as disclosed herein.

DEFINITIONS

The following definitions are provided to facilitate understanding terminology used herein. It is intended that those terms be given their plain meaning except as otherwise defined herein.

Calibration Sphere means an object with at least a portion of its surface substantially spherical to a very high degree. These spherical surfaces may typically be ceramic or finely finished stainless steel, and may have extremely low coefficients of thermal expansion. Typically, these are balls with tapped or bored holes for mounting; they are highly round, with dimensions traceable to well-regarded national or international dimensional standards. The organizations which have developed their standards throughout the world are the International Standards Organization (ISO) which is worldwide, the Anti-Friction Bearing Manufacturer Association (AFBMA) which is in North America, the Japanese Industrial Standards (JIS) in Japan, and the Deutsche Industrial Normen (DIN) in Germany. For instance an AFBMA grade 3 ball has an allowable ball diameter variation of 3µ" (micro-inches) or 0.0762 µm (microns), thus a one inch (1") ball would have a dimension of 1.000000±0.000003.

Calibration fixture means a device with specific surface features that has dimensions traceable to well-regarded national or international standards. Without limitation, these may be perimeters of holes, surface ledges, or the like, in a repeated array in one, two, or three dimensions. This device is useful for calibrating the linearity of measurement accuracy of a CMM or other measurement device.

Improved fixture means the invention disclosed herein, where a single qualification sphere has been attached (either permanently or removably) to a calibration fixture for ease of CMM calibration.

Introduction

This invention allows for a calibration sphere to either temporarily or permanently) become an integral part of a coordinate measurement machine (CMM) calibration fixture for the calibration of a probe tip on a CMM. A calibration fixture typically has a pre-determined set of steps (a spaced apart distance from one to another) that performs a verification of how well a CMM is capable of measuring a known artifact. Spatial-location-based compensation factors that are built into the CMM may be adjusted based on the readings resulting from the measurement of the steps of the calibration fixture, allowing one to obtain accurate readings within a given spatial volume calibrated on a CMM.

CMM calibrations are disclosed in various national testing standards, such as the American National Standards Institute/American Society of Mechanical Engineers (ANSI/ASME) B89.1.12m-1985. These calibrations insure that CMM devices do in fact make accurate measurements over a volume of space to be measured.

Figure 1:
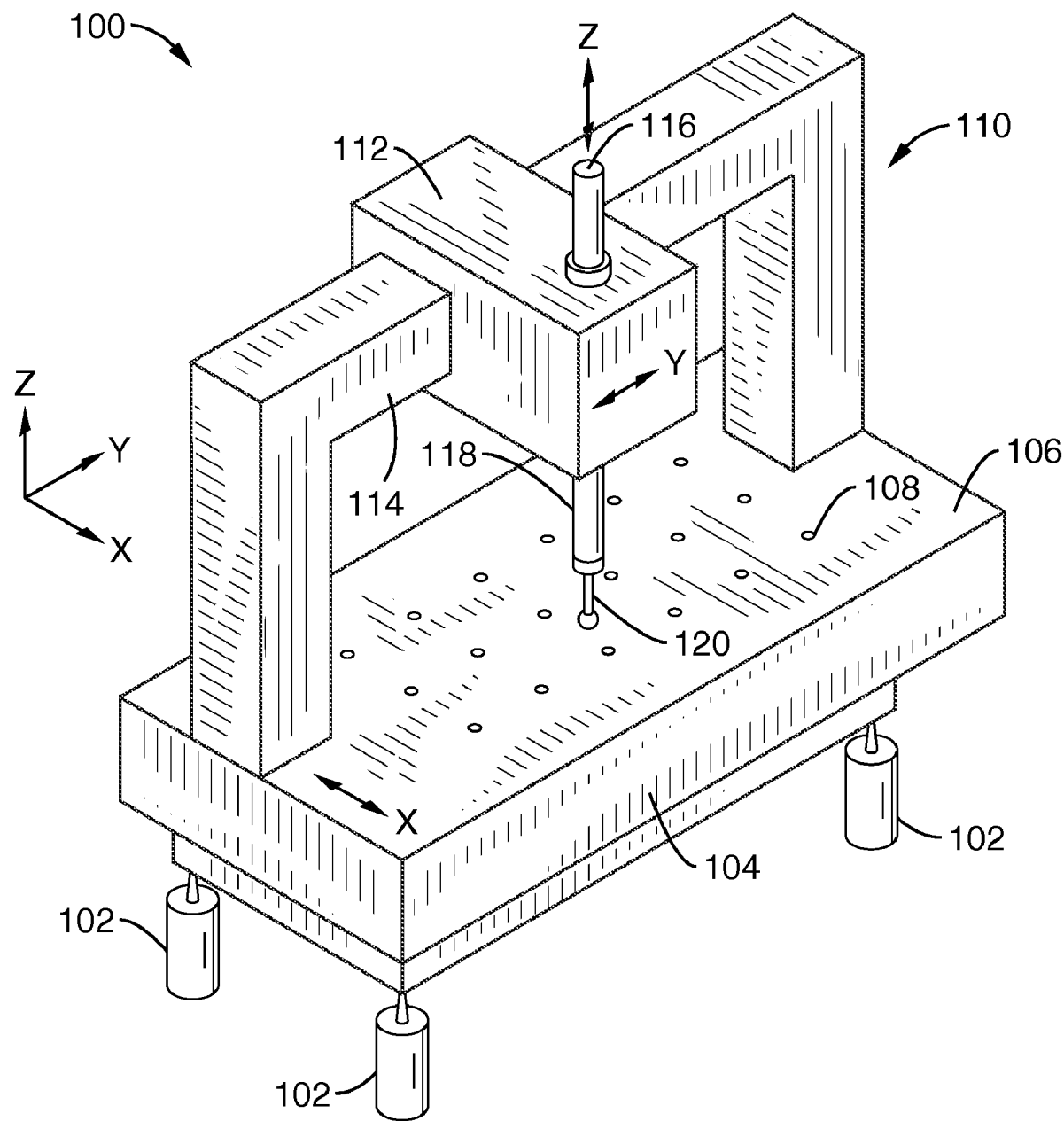
FIG. 1 is a perspective view of an idealized coordinate measurement machine (CMM) with the principal working elements shown.

Refer now to an idealized CMM depicted in FIG. 1. The CMM 100 typically sits on vibration isolators 102 to minimize environmentally induced vibrations. The CMM 100 is further isolated through the use of a heavy granite slab base 104, whose upper surface 106 may have a plurality or pattern of recessed tie down points 108. These tie down points 108 are typically threaded, and may be used to either directly mount a fixture to the CMM 100 bed 106, or may hold down other potential fixtures that in turn hold down an object to be measured. Traversing this base upper surface 106 in one dimension (here arbitrarily chosen to be shown as X) is an X axis translation stage 110. This is indicated as fairly massive, since the dimensions to be measured are exceedingly small, where even leaving a small light-weight object on the translation stage 110 could otherwise unacceptably deflect a measurement.

The Y axis translation stage 112 in turn translates in the Y axis along a top portion 114 of the X axis translation stage 110.

A Z axis translator 116 moves in yet a third linearly independent direction. At the tip of the Z axis translator 118, one finds the actual CMM probe tip 120 that actually performs the measurement.

Not shown on the CMM are an array of (typically digital) readouts that monitor movements of the X 110, Y 112, and Z 116 axes, as well as the associated controllers, cabling, and a computer controlling movement of the CMM probe tip 120 through a set of coordinated motions and thus measure a complex part.

Figure 2:
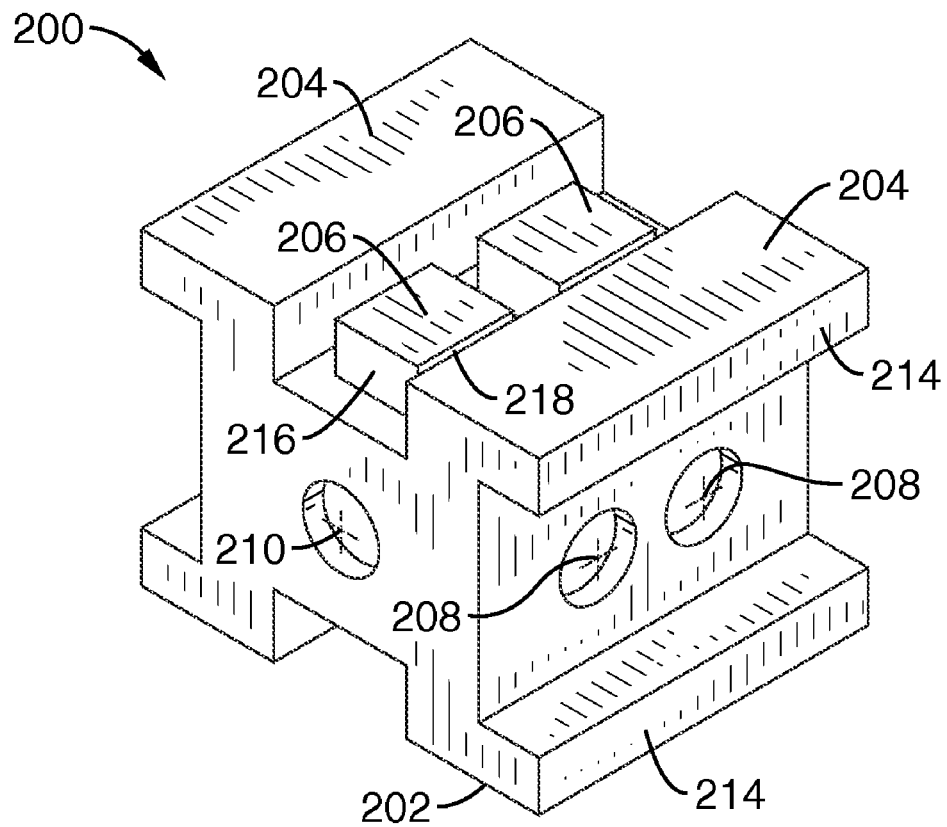
FIG. 2 is a perspective view of a simplified calibration fixture with several potential calibration surfaces shown.

Refer now to FIG. 2, which is a perspective view of a simplified calibration fixture 200. Such fixture may be made of metal or ceramic, or both, with the important considerations being dimensional stability and ease of fabrication. Typically, there is a base 202 for mounting the calibration fixture 200 to a CMM bed (106 in FIG. 1). From the base 202 may be a plurality of calibrated features, such as a top surface 204, top lands 206, and side holes 208. An end hole 210 may be present at one or both ends. An end surface 212 is typically precision ground to a high degree of flatness, and is perpendicular to the top surface 204 and sides 214. The top land 206 may also have a precision edge surface 216 parallel to the end surface 212, and may also have a precision lengthwise edge surface 218 parallel to the sides 214. By knowing the accuracy of theses various features, a CMM may be calibrated.

Although not shown in the figures, one such example of a calibration fixture that may be used for CMM 100 calibration is a bar with accurately machined surface features manufactured by Kolb & Baumann GmbH & Co. KG, Daimlerstraβe 24, D-63741 Aschaffenburg, Germany. The Kolb & Baumann bar is referred to typically as a "Koba Bar"; Kolb & Baumann refer to it as a "Koba step", or "Koba mini step" in its smaller sized incarnation.

A calibration fixture has a predetermined set of calibration features, most commonly flat-surfaced (or other well known geometry, such as cylindrical or spherical) steps (at a spaced apart distance from one to another) that allows one to perform a verification of how well a CMM is capable of measuring the know artifact.

Figure 3:
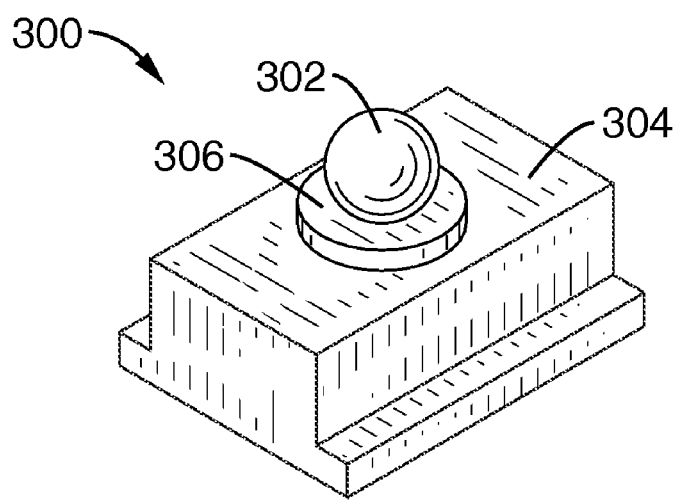
FIG. 3 is a perspective view of a calibration sphere assembly, showing a typical mounting technique.

Refer now to FIG. 3, which is a calibration sphere assembly 300 comprising a calibration sphere 302 with a base 304. There may or may not be present a calibration sphere platform 306 that provides attachment between the base 304 and the calibration sphere 302.

Typical Coordinate Measurement Machine (CMM) Calibration Methods

Refer now to FIGS. 1-3. In typical CMM calibration, a calibration sphere assembly 300 is attached to the bed 106 of the CMM 100 and a series of measurements of the CMM calibration sphere is done. This qualification procedure determines how well the CMM probe tip 120 is able to measure the know diameter and roundness of the calibration sphere 302, whose diameter and roundness are known to exceedingly high levels that typically originate from a dimensional standards laboratory. If the series of measurements of the calibration sphere 302 by the CMM probe tip 120 agree with the known dimensions of the calibration sphere 302 as determined by a dimensional standards laboratory then the CMM 100 is said to have been qualified by the calibration sphere 302.

Once the CMM 100 has been qualified by the calibration sphere 302, then the calibration sphere assembly 300 is then removed from the CMM bed 106, and replaced by a calibration fixture 200 mounted on the CMM 100 bed 106 for calibrated fixture 200 measurements.

The calibration fixture 200 typically has a series of calibration features as described above, whose dimensions are known with great accuracy. When such a calibration fixture 200 is positioned on the bed 106 of the CMM 100, then measurement of the known features in the calibration fixture 200 is then performed. If, for whatever reason, it appears that the measurements of the known calibration fixture 200 features are incorrect as compared with their known values and tolerances, then the calibration fixture 200 must be removed from the CMM 100 bed 106, and the qualification sphere assembly 300 reattached to the bed 106 of the CMM 100 yet again, and the above process is repeated.

It is important to note that the calibration sphere 302, while extremely dimensionally accurate in and of itself, may be randomly positioned on the CMM 100 bed 106 due to the lack of any mechanism to repeatably locate the calibration sphere 302 relative to the CMM bed 106 to extremely high accuracy.

Each time the calibration fixture 200 is slightly moved on the bed 106 of the CMM 100, measurements are taken with CMM probe tip 120 and recorded in the CMM computer memory. Since these measurements are resident in the CMM computer memory, a predetermined set of measurements on the calibration fixture 200 mounted on the CMM 100 may be made. Once there is a set of measurements in the CMM computer memory, remeasuring may occur with greater rapidity to reduce statistical measurement inaccuracies by the CMM computer simply stepping through the prior measurement list. This can occur over and over if, and only if, the calibration fixture 200 is not moved or shifted in position from the CMM 100 bed 106.

When the calibration fixture 200 is moved to an entirely new orientation, the calibration feature measurements have previously been recorded by the CMM computer software. With this information, the CMM computer software may calculate from a few initial measurements where the remaining calibration fixture 200 measurement locations are likely to be in the new orientation. Thus, the remaining measurements of the well-known (certainly well-known within ~0.050" or ~2 mm for gross random mounts on the CMM bed 106) calibration features on the calibration fixture 200 may be made automatically.

The time required from the initial set up of the calibration sphere assembly 300, qualification of the CMM 100 with the calibration sphere 302, to the measurement to specific calibrated features of the calibration fixture 200 may take on the order of approximately 30 minutes.

Each time the calibration fixture 200 is removed to requalify the probe tip 120 on the calibration sphere 302 the time lost is about 30 minutes. For complete CMM calibration throughout its measurement volume, the calibration fixture 200 is positioned at a minimum of seven different positions. Thus, if the calibration fixture 200 is moved, time is wasted.

Figure 4A:
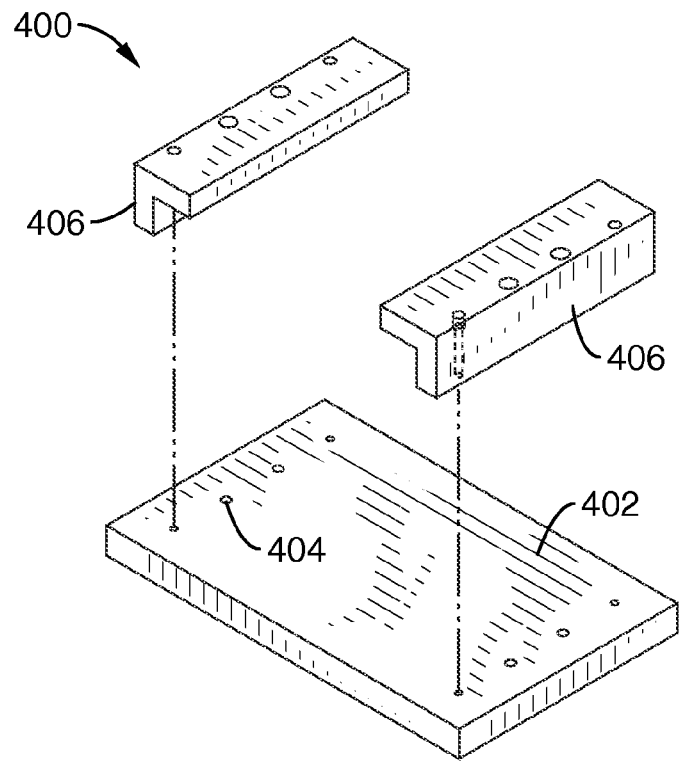
FIG. 4A is a perspective view of a hold-down fixture for the calibration fixture previously described in FIG. 2.

Referring now to FIG. 4A, we see the hold-down 400 for the traditional calibration fixture 200 previously described in FIG. 2. A base 402 connects to two L-shaped pieces 406 to hold down the calibration fixture 200 between them. Not shown here are the various hold-down 400 indexing and alignment dowels used to align the various part and minimize movement after attachment.

Figure 4B:
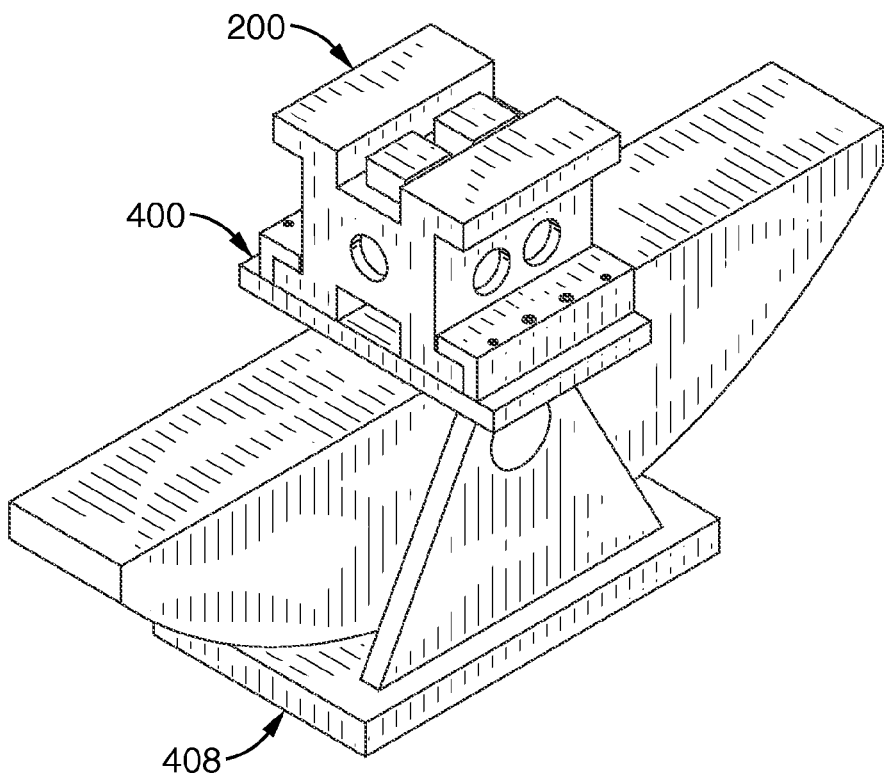
FIG. 4B is a perspective view of a stand to which is mounted the calibration fixture previously described in FIG. 2.

Refer now to FIG. 4B, where we see a stand 408 assembled with one of the hold-downs 400. This method is one way to retain the calibration fixture 200 to the hold-down base 402. The stand 408 may be secured to the CMM 100 base 106 through one or more retention holes 108 in the CMM 100 base 106.

An Improved CMM Calibration Fixture

Figure 5:
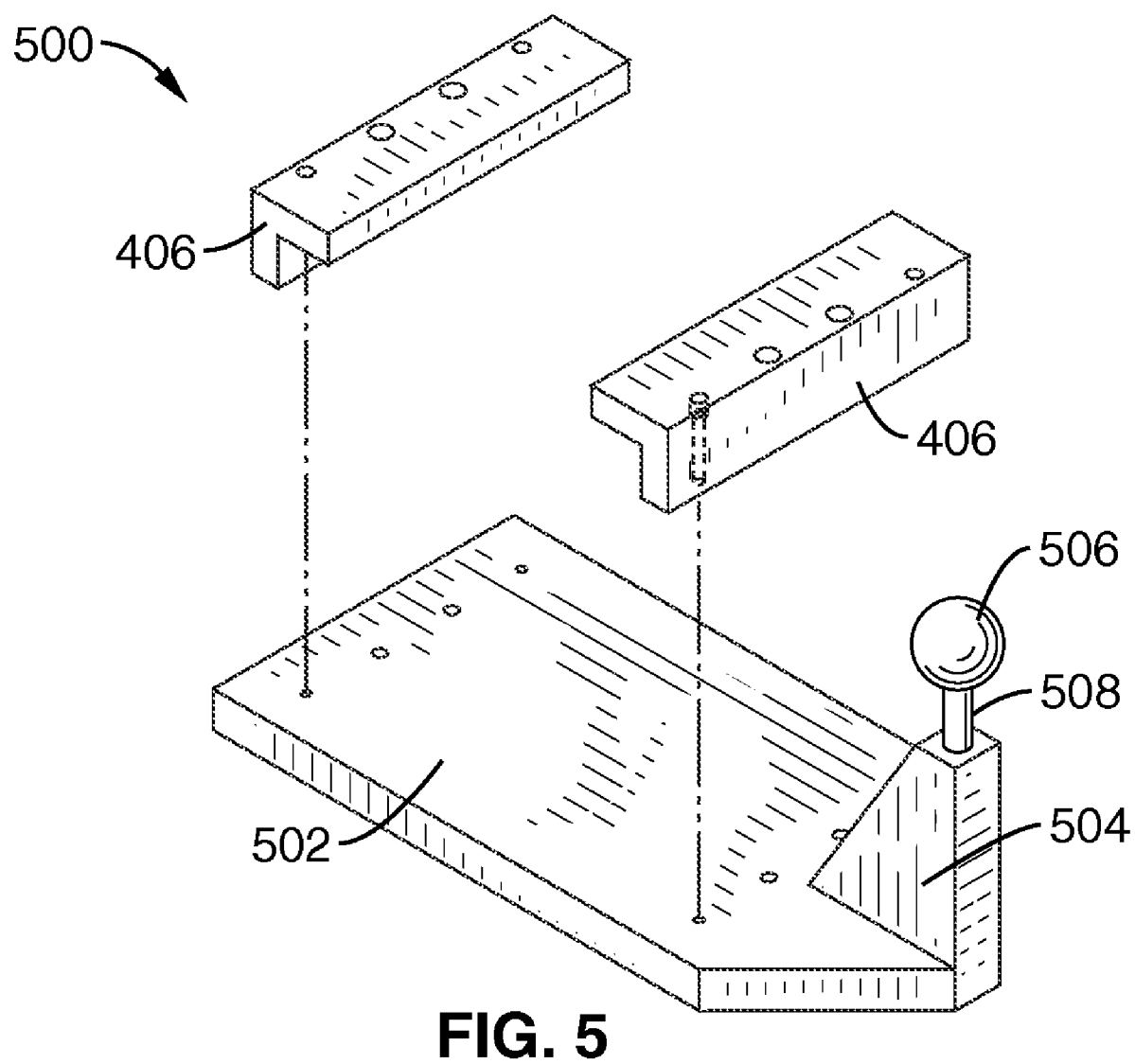
FIG. 5 is a perspective view of an integrated calibration sphere and calibration fixture mount showing an improvement of the hold-down fixture of FIG. 4 allowing for simultaneous calibration sphere and calibration fixture mounting.

Refer now to FIG. 5. An integrated calibration sphere and calibration fixture 500 mount is shown. This integrated fixture eliminates the loss of time due to frequently removing the calibration fixture and the calibration sphere by mounting them on an integrated calibration sphere and calibration fixture 500 hold down. In the integrated sphere and calibration fixture 500 mount, the base 502 has been extended and projected vertically with extension 504. There, a calibration sphere 506 may either be directly mounted to the extension 504, or may be vertically extended further by means of a riser 508 as indicated. The riser 508 may be a press fit dowel pressed at both ends to keep the calibration sphere 506 firmly attached to the extension 504. Alternatively, the riser 508 may be merely a very close sliding lapped connection at the calibration sphere 506 to allow for the calibration sphere 506 to be removable. Still other means of attachment to allow for either removable or irremovable assembly may be readily discerned by practitioners in the art.

Figure 6A:
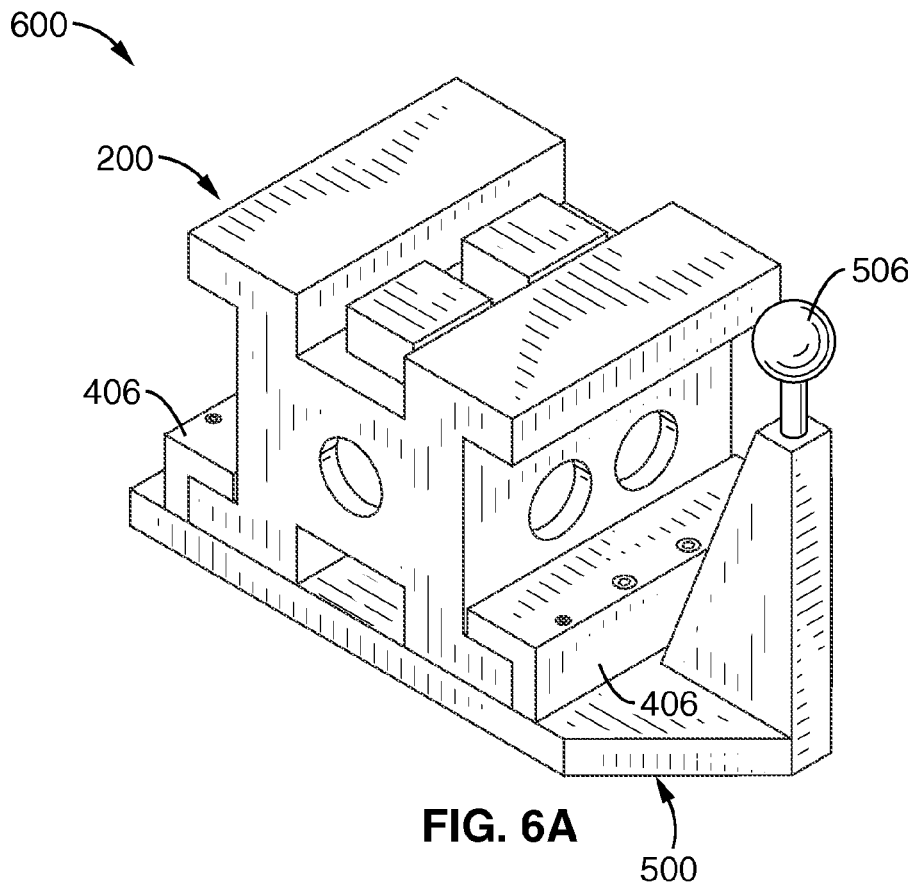
FIG. 6A is a perspective view of the integrated calibration sphere and calibration fixture mount of FIG. 5 shown mounted to the calibration fixture previously shown in FIG. 2 with the calibration sphere attached.
Figure 6B:
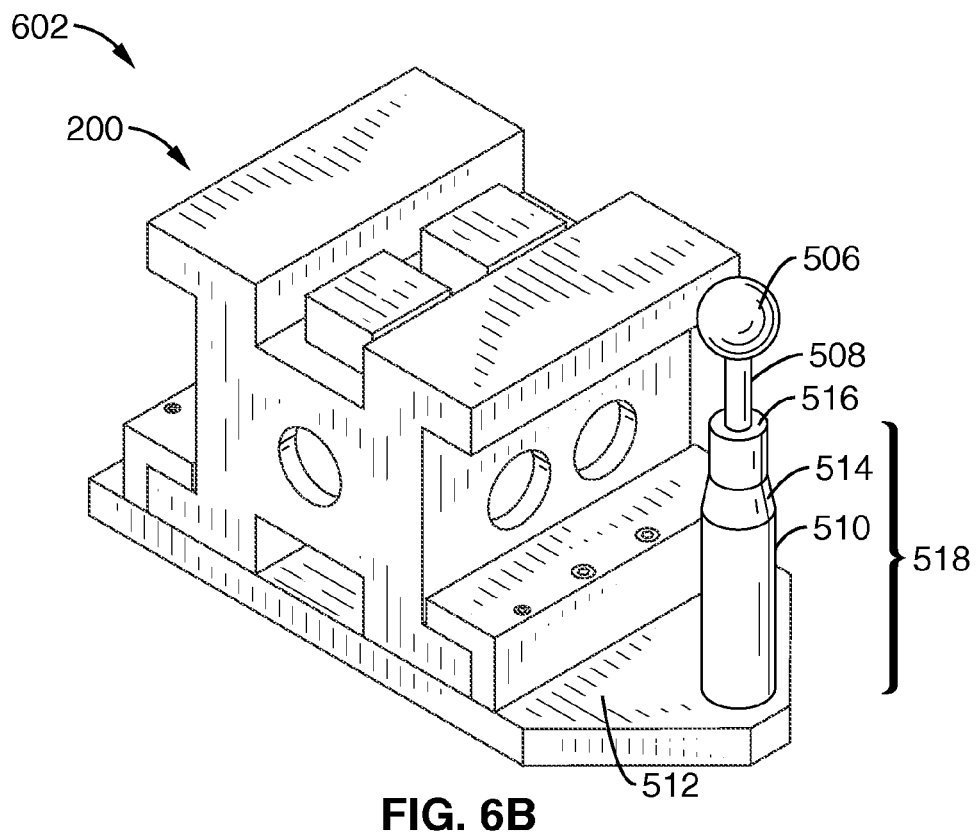
FIG. 6B is a perspective view of another improved integrated calibration sphere and calibration fixture mount shown mounted to the stand of FIG. 4B retaining the calibration fixture previously shown in FIG. 2 with the calibration sphere attached.

Referring now to FIGS. 6A and 6B, the integrated calibration sphere and calibration fixture 600 is shown, with the major components of the calibration fixture 200, the integrated calibration sphere 506 and calibration fixture 200 mount 500.

FIG. 6B shows an improved integrated calibration sphere and calibration fixture mount shown mounted to a traditional calibration fixture previously shown in FIG. 2 with the calibration sphere attached 602. This is improved from a machining efficiency and cost standpoint because, rather than removing a large percentage of a block of metal to form the extension support post (504 shown in FIG. 5), a post 510 is attached to the base extension region 512 to form that function. This is more efficient, and less costly due to decreased machining time and material due to reduced material removal. Additionally, post 510 may be readily manufactured on numerically controlled lathes. The post 510 may or may not be tapered 514 at the top 516 to provide relief from the calibration sphere 506 as it is measured in various orientations with the CMM probe tip 120 (shown previously in FIG. 1). The post 510, any taper 514, and top 516 may be referred to as a pedestal 518.

Alternate embodiments may also be formed by attaching the calibration sphere to the calibration fixture in other ways as described below.

Refer now to FIG. 7. This embodiment of the calibration sphere mounted to a calibration fixture 700 comprises an initial calibration fixture 200, to which a calibration sphere 702 is attached to a calibration fixture mount 704. Here the calibration fixture mount 704 may have a pressure bearing plate 706 that receives the tips of set screws 708 threaded though the calibration fixture mount 704 so as to hold the calibration fixture mount 704 to the calibration fixture 200 through a clamping effect.

The calibration fixture mount 704 may be designed to mount to a plurality of common CMM calibration fixtures, thus enabling providing an integrated capability to both original and retrofit devices.

An Improved CMM Calibration Fixture Application

Any of the embodiments above may be used for integrated CMM calibration, which is greatly simplified by having a calibration sphere attached to the calibration fixture that does not require prior removal for CMM measurement of either the calibration sphere or calibration fixture.

Refer now to FIG. 8, which is essentially an overlay of FIGS. 1 and 6A. Also refer to typical sequence for CMM 100 qualification using the improved device 600 follows:

(1) An integrated calibration sphere 506 mounted to a calibration fixture 200 (known as an integrated calibration fixture 600) is provided 902 (note, this may require attaching a calibration sphere, if not already connected);

(2) The integrated calibration fixture 600 is positioned at one of the positions required for verification and calibration 904 of the CMM 100 on the CMM bed 106.

(3) When the measured dimensions of the known calibration features of the integrated fixture 600 exceed the tolerances stated by the manufacturer, requalification begins 904. Here, the CMM probe tip 120 is requalified 908 with the calibration sphere 506 that is already attached to the integrated fixture 160.

(4) After requalification of the CMM probe tip 120 the integrated fixture 600 may be automatically remeasured without relocating the calibration fixture 200 (by using the previous measurement steps already stored as historical measurements in the CMM software memory). Since the calibration sphere 506 is already attached to the integrated fixture 600, the calibration sphere 506 does not need to be moved to requalify the CMM probe tip 120, because the coordinates of the calibration fixture 200 are roughly known to the CMM software, which can be stepped though its previous measurement sequence again to remeasure the calibration features on the calibration fixture 200.

(5) The sequence of steps above are repeated in the X, Y, Z, or diagonal positions as required to completely qualify the CMM 100 within a spatial volume.

Restating the previous process, FIG. 9 shows a flowchart 900 of the process steps described above in steps 1-5. Initially, the calibration sphere is mounted to the calibration fixture 902 using one of the many methods described above. The calibration fixture, with the calibration sphere attached, is positioned for calibration 904. Then, the calibration fixture is measured 908. If the calibration fixture is within tolerances 910, then measurement is either 912 done 914, or may be repeated 916.

CONCLUSION

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An integrated calibration sphere and qualification fixture, comprising:
    a calibration sphere;
    a calibration fixture comprising a plurality of calibration features; and
    a clamp that provides a removable attachment of the calibration sphere to the calibration fixture.

2. The integrated calibration sphere and calibration fixture of claim 1, wherein the clamp directly attaches to the calibration sphere.

3. The integrated calibration sphere and calibration fixture of claim 1,
    wherein the clamp directly attaches to a pedestal that in turn attaches to the calibration sphere.

4. The integrated calibration sphere and calibration fixture of claim 1, wherein the clamp does not substantially deflect any of the calibration fixture calibration feature dimensions.

5. The integrated calibration sphere and calibration fixture of claim 1, wherein the means for attaching the calibration sphere to the calibration fixture comprises:
    a threaded portion threaded into a receiving portion of the calibration sphere; wherein the calibration sphere is removable.

6. The integrated calibration sphere and calibration fixture of claim 1, wherein the means for attaching the calibration sphere to the calibration fixture comprises:
    an adhesive disposed between the calibration sphere and the calibration fixture;
    wherein the calibration sphere is removable.

7. An integrated calibration sphere and calibration fixture, comprising:
    a calibration sphere;
    a calibration fixture comprising a plurality of calibration features; and
    a mount, disposed between and that attaches to, both the calibration sphere and the calibration fixture;
    wherein the mount comprises:
    a clamp, whereby the calibration fixture calibration features are not substantially dimensionally deflected by attachment of the clamp; and
    means for attaching the mount to the calibration sphere;
    wherein the means for attaching fails to cause a deformation of the mounted calibration sphere by more than an allowable tolerance of the unmounted calibration sphere.

8. The integrated calibration sphere and calibration fixture of claim 7, wherein the mount comprises one or both of the attachments of the group consisting of a removable attachment of the calibration sphere and a removable attachment of the calibration fixture.

9. The integrated calibration sphere and calibration fixture of claim 7, wherein the mount comprises one or both of the attachments selected from the group consisting essentially of a nonremovable attachment of the calibration sphere and a nonremovable attachment of the calibration fixture.

10. An integrated calibration sphere and calibration fixture, comprising:
- a calibration sphere;
- a calibration fixture comprising a plurality of calibration features; and
- a mount, disposed between and that attaches to, both the calibration sphere and the calibration fixture;
- wherein the mount attachment of the calibration sphere to the calibration fixture comprises:
- a threaded portion that projects from the mount, threaded into a receiver portion of the calibration sphere;
- a precision ground pin that projects from the mount into a close-fit receiver portion of the calibration sphere; and
- a flat region on the mount, to which the calibration fixture is adhesively mounted.

11. A method of coordinate measurement machine (CMM) calibration using an integrated calibration sphere mounted to a calibration fixture, comprising:
  (a) providing an integrated calibration sphere mounted to a calibration fixture;
  wherein the calibration fixture comprises a plurality of calibration features; and
  a mount, disposed between and that attaches to, both the calibration sphere and the calibration fixture;
  wherein the mount comprises:
  a clamp, whereby the calibration fixture calibration features are not substantially dimensionally deflected by attachment of the clamp; and
  means for attaching the mount to the calibration sphere;
  wherein the means for attaching fails to cause a deformation of the mounted calibration sphere by more than an allowable tolerance of the unmounted calibration sphere;
  (b) qualifying a coordinate measurement machine (CMM) by measuring the calibration sphere; then
  (c) measuring a plurality of calibrated features on the calibration fixture;
  (d) determining whether the CMM measures to within an allowable tolerance zone:
  (e) if within a tolerance zone, then completing the CMM calibration;
  (f) otherwise returning to step (b) without removal of the calibration sphere.

12. The integrated calibration fixture of claim 11, wherein the integrated calibration sphere mounted to the calibration fixture is removable from the calibration fixture.

13. An improved calibration fixture for integrated calibration sphere and calibration fixture coordinate measurement machine (CMM) calibration, said calibration fixture including a plurality of calibration features, the improvement comprising:
- a calibration sphere mounted to the calibration fixture to allow CMM measurement of the calibration sphere and of the calibration fixture, without removal of either the calibration sphere or the calibration fixture from the CMM;
- wherein the calibration fixture comprises a plurality of calibration features; and
- a mount, disposed between and that attaches to, both the calibration sphere and the calibration fixture;
- wherein the mount comprises:
- a clamp, whereby the calibration fixture calibration features are not substantially dimensionally deflected by attachment of the clamp; and
- means for attaching the mount to the calibration sphere;
- wherein the means for attaching fails to cause a deformation of the mounted calibration sphere by more than an allowable tolerance of the unmounted calibration sphere.

14. The improved calibration fixture for integrated calibration sphere and calibration fixture coordinate measurement machine (CMM) calibration of claim 13, wherein the calibration sphere is removably mounted to the calibration fixture.

* * * * *